United States Patent [19]

Ng

[11] Patent Number: 5,130,821
[45] Date of Patent: Jul. 14, 1992

[54] METHOD AND APPARATUS FOR DIGITAL HALFTONING EMPLOYING DENSITY DISTRIBUTION FOR SELECTION OF A THRESHOLD TEMPLATE

[75] Inventor: Yee S. Ng, Fairport, N.Y.

[73] Assignee: Eastman Kodak Company, Rochester, N.Y.

[21] Appl. No.: 509,271

[22] Filed: Apr. 16, 1990

[51] Int. Cl.$^5$ .............................................. H04N 1/40
[52] U.S. Cl. ...................... 358/457; 358/458; 358/459
[58] Field of Search ............. 358/456, 457, 458, 459, 358/466

[56] References Cited

U.S. PATENT DOCUMENTS

| | | | |
|---|---|---|---|
| 4,246,614 | 1/1981 | Knox | 358/456 |
| 4,482,923 | 11/1984 | Fischer et al. | 358/456 |
| 4,547,811 | 10/1989 | Ochi et al. | 358/466 |
| 4,547,812 | 10/1985 | Waller et al. | 358/459 |
| 4,566,042 | 1/1986 | Cahill | 358/300 |
| 4,622,595 | 11/1986 | Hisatake et al. | 358/296 |
| 4,677,493 | 6/1987 | Shinya | 358/283 |
| 4,742,399 | 5/1988 | Kitamura | 358/466 |
| 4,742,400 | 5/1988 | Tsuji | 358/457 |

OTHER PUBLICATIONS

Young, Tzay Y., Ed., Handbook of Pattern Recognition & Image Processing, 1986, pp. 264-265.

Primary Examiner—David K. Moore
Assistant Examiner—Barry Stellrecht
Attorney, Agent, or Firm—Norman Rushefsky

[57] ABSTRACT

Apparatus and method for converting digital, gray-level, image input data into binary valued halftone cells and preserving some of the sharpness information of the original data. The data is first converted to input halftone cells in which the pixel density gradient is analyzed to determine the density distribution within the cells. Depending upon the gradient, particular threshold value templates are selected to be used for thresholding the input data. Each template develops the output pixels beginning at different regions of the output halftone cell. The template for each input cell is selected which grows the binary pixels in the same region occupied by the densest pixels in the gray-level input data.

8 Claims, 4 Drawing Sheets

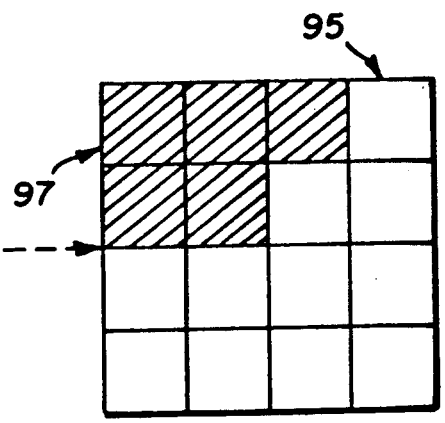
FIG. 14
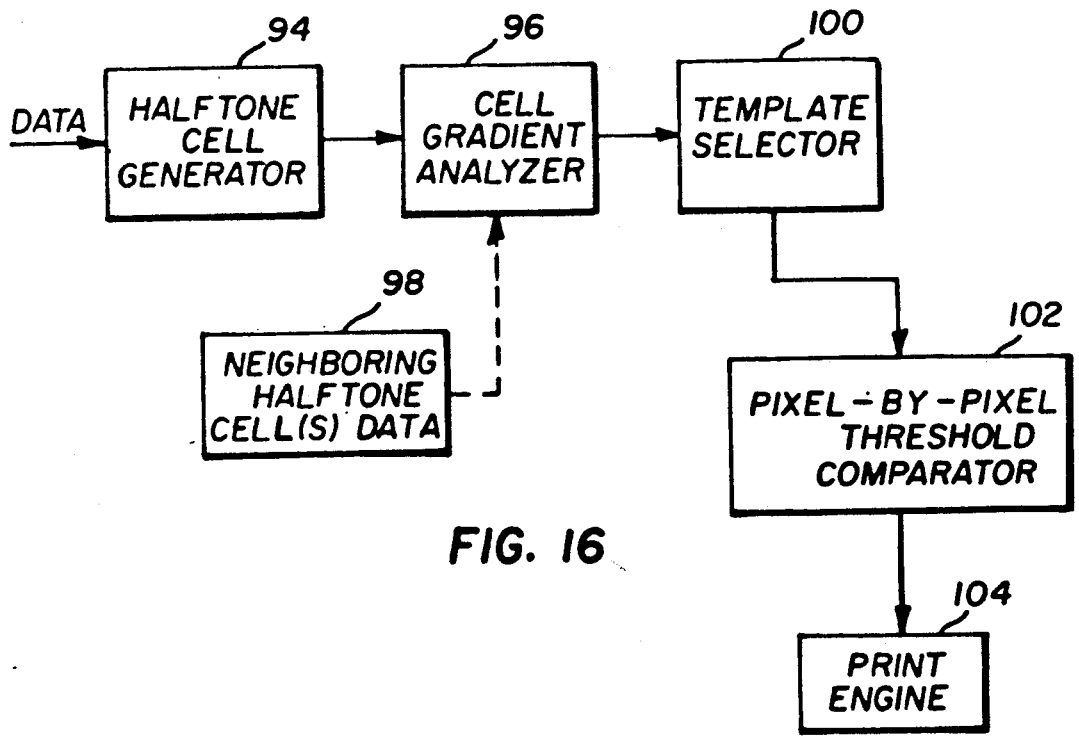
FIG. 15
FIG. 16

METHOD AND APPARATUS FOR DIGITAL HALFTONING EMPLOYING DENSITY DISTRIBUTION FOR SELECTION OF A THRESHOLD TEMPLATE

BACKGROUND OF THE INVENTION

1. Field of the Invention

This invention relates, in general, to photocopying and, more specifically, to copiers, printers, and like devices which use digital data to produce the hard-copy output image.

2. Description of the Prior Art

Digital halftone processing, which can be used in electronic copiers and printers, offers advantages when reproducing certain types of image data, especially data representing continuous tone images. Some processing techniques associated with halftoning use cluster dot formation in the developed halftone cells. With cluster dot, the individual pixels in the cell grow or develop in an orderly pattern from the center of the cell. When the overall cell density has been determined from pixels which were not located at the center of a cell, the output data does not truly reflect the input data and some of the sharpness of the image is lost in the processing. Thus, the reproduced image is lower in quality than desired.

In an effort to improve the quality of digitally halftoned binary outputs, various systems have been used according to the prior art. Dispersed dot and error diffusion have been used with a certain degree of success. These methods use many single pixel dots in the lower to medium density region, therefore taxing the ability of the reproduction device, or print engine, to maintain consistency throughout the image. Another prior art system functions by looking at the input density within the halftone cell and identifying where teh highest density output pixel is located. The first printed pixel is located at the corresponding location in the output cell. Then, the location of the next highest density output pixel within the cell is determined and the next binary pixel is placed at the corresponding location. The process is continued until the average density represented by the halftone cell is closest to the input cell density. This provides a halftone cell wherein the dots or printed binary pixels vary the location of the center within the cell depending upon the input sharpness and graylevel input information. All of these methods suffer from the fact that they are computationally intensive and require certain restraints is overall system hardware selection and operational speed.

In U.S. Pat. No. 4,246,614, issued on Jan. 20, 1981, a system is described wherein the "black" center of the halftone cell is shifted to align the center-printed pixel with the corresponding "black" center of a video image signal. (See colunm 3, lines 3-14 of that patent.) This process is used in rescreening applications where the original has been screened at one frequency and the digital rescreening is accomplished at another frequency. (See column 1, lines 11-13.) Only the centers of the cells are affected. This patent does not teach a processing system wherein the density distribution of the cell data, as opposed to just the center of the cell, governs the selection of thresholding value patterns for use in the process.

Therefore, it is desirable, and an object of this invention, to provide a digital halftoning system wherein the data is thresholded for binary reproduction without signaificant loss in sharpness detail.

SUMMARY OF THE INVENTION

There is disclosed herein a new and useful gray-level-to-binary halftone conversion technique which preserves much of the sharpness in the original input data. The pixel density gradient in the input halftone cell is analyzed to determine the region within the cell of the densest pixels. Depending upon the region determined, a particular template of threshold values is selected which contains threshold values arranged to develop the dots or pixels in the binary output halftone cell beginning at the same density region determined for the input cell. By using this technique, not only is the overall densisty of the output cell similar to that of the input cell, the density is concentrated within the output cell in the same region that the density was concentrated in the input cell, thus preserving the sharpness.

According to a specific embodiment of the invention, a 4×4 pixel halftone cell is analyzed to determine the pixel density gradient within the cell for purposes of selecting one of nine different threshold templates. Separate templates are used to develop the binary dots from the center of the cell, the four corners of the cell, and the four edges of the cell. The threshold values within the templates are equal to each other with the difference being arrangement or location of the threshold values within the cell. By comparing the input data pixel-by-pixel to the threshold values in the template, in output cell is formed with a cluster dot technique wherein the binary pixels develop from the same region as the densest gray-level pixel in the input cell.

BRIEF DESCRIPTION OF THE DRAWINGS

Further advantages and uses of this invention will become more apparent when considered in view of the following detailed description and drawings, in which:

FIG. 14 illustrates a typical threshold template which can be used for right-edge pixel development;

FIG. 15 illustrates a threshold template for upper left corner pixel development and the resulting binary output cell when applied to the data shown in FIG. 3; and FIG. 16 is a block diagram illustrating the apparatus components of the invention.

DESCRIPTION OF THE PREFERRED EMBODIMENTS

Figure 1:
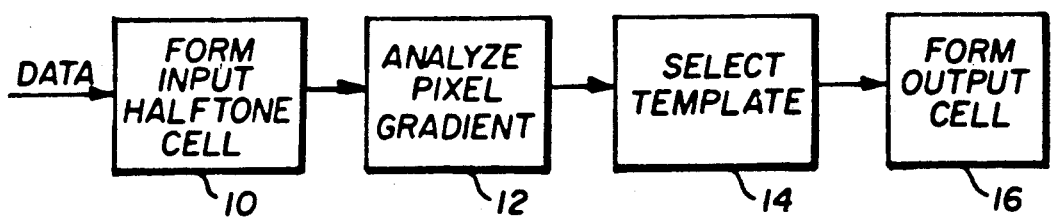
FIG. 1 is a block diagram illustrating the main functions of the apparatus.

Throughout the following description, similar reference characters refer to similar elements or members in all of the figures of the drawings.

Referring now to the drawings, and to FIG. 1 in particular, there is shown a block diagram illustrating the main functions of the invention. The data input to the system contains digital values which represent gray-level rasterized pixels from a suitable data source, such as a computer, workstation, or document scanner. This rasterized data is formed into a halftone cell by electronically processing the data, as indicated in block 10. For the purposes of illustration, this specific embodiment of the invention uses eight-bit input data having gray-level values between 0 and 225 and halftone cells which are arranged in a 4×4 pattern containing 16 pixels. Other levels and cell patterns may be used within the contemplation of the invention.

The pixel gradient within each cell is analyzed, according to block 12, to determine the location of the densest pixels within the cell. Once this gradient information is known, block 14 selects a particular template or matrix of threshold values. This template is used to convert the density values for the individual pixels in the halftone cell into binary values of an output cell which will be rendered or printed by another device, as indicated in block 16. Thus, the digital gray-levels originally applied to the apparatus are grouped into halftone cells where the sharpness of the pixels within the halftone cell is determined and used to control the thresholding process which forms the binary output cell used by the binary reproducing device.

Figure 2:
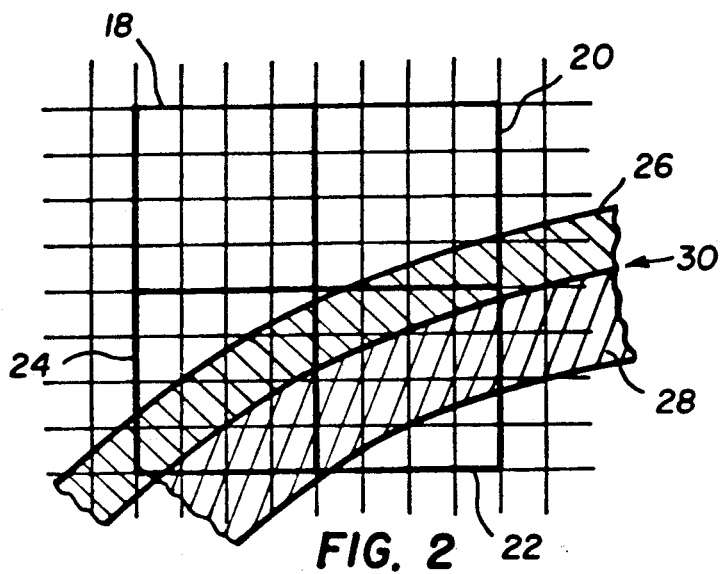
FIG. 2 is a diagram showing typical input halftone cells.

FIG. 2 is a diagram showing typical input halftone cells and a typical image line represented by the pixels in the cells. Input halftone cells 18, 20, 22 and 24 each include a 4×4 array of 16 pixels within the cell. The original image which is represented by the cell, and pixels within the cells, can take many different forms. In this example, a portion of a line 30 is illustrated wherein a dark or high density region 26 of the line passes across three of the halftone cells adjacent to a lighter or less dense region 28 of the line 30. Assuming that the eight-bit gray-level values for the pixels have been formed or scanned to represent the line 30, it should be evident that none of the pixels within cell 18 would have any density value. Assuming perfect scanning or representation, all of these 16 pixels would have a value of 0, assuming that 0 represents the least dense value and 255 represents the darkest or highest density value. In cell 20, some of the lower pixels in the cell will have a density value somewhere between 0 and 255 because of the dark portion 26 of the line. In a similar fashion, many of the pixels in cell 24 will have intermediate digital values because of the two regions of the line 30 contained within the cell 24.

Figure 3:
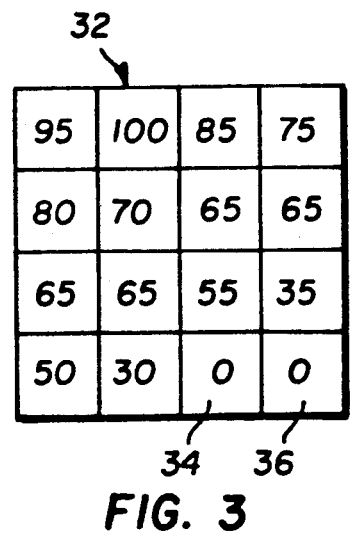
FIG. 3 illustrates digital gray-level pixel values for a cell shown in FIG. 2.

The pixel values for halftone cell 22, by way of example, are shown in the diagram of FIG. 3. The input cell 32 shown in FIG. 3 contains a digital value for each of the 16 pixels within the cell corresponding to the density determined by the line 30 crossing through the halftone cell 22. Pixels 34 and 36 have a value of 0 because these pixels are void of any density from the line 30 as shown in FIG. 2. The values for the remaining pixels are governed by the amount and density of the line 30 which passes through the pixels. While these values represent the individual pixel values within the input cell 32, conventional practice has done little to preverve the sharpness, or relative position, of these pixel values in the final binary output. It should be evident from both FIGS. 2 and 3 that the region of high density within the cell is shifted more toward the upper left-hand corner than toward the lower right-hand corner. It is this type of sharpness that is desired to be preserved by the invention.

Figure 4:
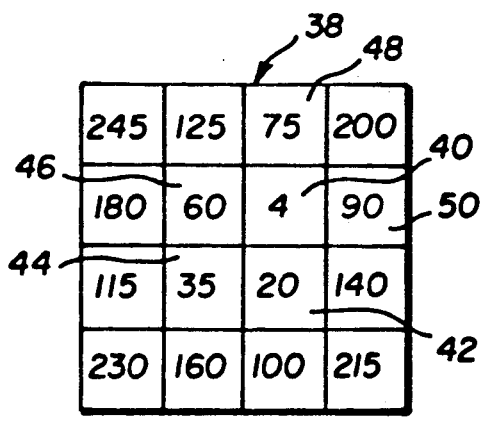
FIG. 4 illustrates a threshold template for center developing of output pixels.

FIG. 4 illustrates a typical threshold matrix or template 38 which can be used to convert the digital values from the input cell of FIG. 3 into a binary output halftone cell. This technique is known as cluster dot formation since the dots or pixels within the cell grow or develop according to an ordered pattern, depending upon both the threshold values and the digital values of the input data. The template 38 is typical of the arrangement or sequence of threshold values used in cluster dot formation. For example, the lowest threshold value is positioned at pixel location 40. The next highest threshold level is at location 42, and the sequence continues through locations 44, 46, 48 and 50. The remaining location sequence can be determined by observing the threshold values and progressing around the cell the the next higher threshold value. It is emphasized that these are threshold value which are compared with the eight-bit digital values in the orginal information to determine whether to print or not print a particular pixel in binary form. If the threshold level is met, which can be either defined as greater than the threshold value or equal or greater than the threshold value, then, for purposes of this description, a pixel is printed at that location. Otherwise, the location is not printed. According to this thresholding and template orientation, halftone information tends to develop beginning at the center of the cell and progressing around the a circular motion until the outer extremities of the cell have been filled with printed pixels in the case of a truly high density input cell.

Figure 5:
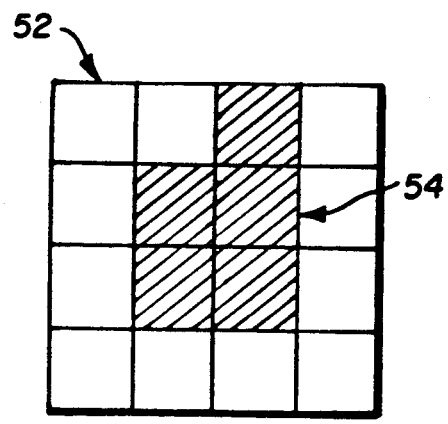
FIG. 5 illustrates a binary output cell constructed from the data of FIG. 3 and the templete of FIG. 4.

FIG. 5 represents the output cell 52 which would be constructed from the data of FIG. 3 and the template of FIG. 4. By comparing the corresponding threshold values in FIG. 4, "pixel-by-pixel," with the input data for the pixels in FIG. 3, only the five-pixel group 54 is printed. Thus, according to the prior art which uses cluster dot formation without preserving any of the sharpness within the cell, the data of FIG. 3, which represents halftone cell 22 in FIG. 2, produces the output cell 52 shown in FIG. 5. Although the overall density of the cell 52 may be close to that of the cell 22, the particular location of the dense pixels within the cell, or sharpness, is not similar to that of the line 30 crossing cell 22. For this reason, typical cluster dot formation loses a degree of sharpness when converting digital halftone cells into binary halftone cells by the process just described.

Figure 6:
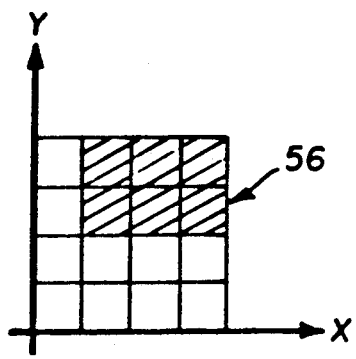
FIG. 6 illustrates an input halftone cell wherein the densest pixels are located generally in the upper right corner of the cell.

In order to preserve some of the sharpness in the input information, this invention uses a selection technique which selects a particular threshold template pattern depending upon the location of the densest pixels within the input cells. FIG. 6 can be used in describing the operation of the invention and represents a typical input halftone cell wherein the densest pixels are located in the upper right-hand corner of the cell. Six-pixel block 56 contains six pixels of approximately the same density value which represent the total density for the entire cell since the other pixels have a low or 0 density value. The input cell 58 in FIG. 9 indicates the digital values which represent the halftone cell shown in FIG. 6, with all of the dense pixels being between the values of 130 and 150.

Figure 7:
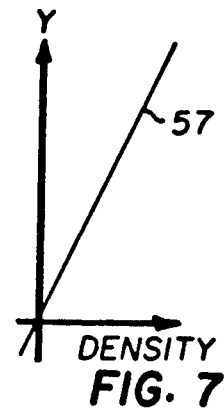
FIGS. 7 and 8 are density gradient diagrams for the cell shown in FIG. 6.
Figure 8:
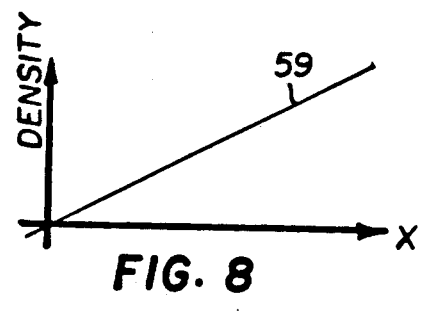

Analyzing the density distribution within the cell 56 determines the location of the densest pixels and, ultimately, the threshold pattern which will be used in converting the data to binary values. FIGS. 7 and 8 are density gradient diagrams for the cell 56 which indicate the shifting of the density toward one portion of the cell. The lines 57 and 59 are smoothed or generalized somewhat to show the overall gradient pattern rather than being stepped-up in density for each pixel location where the density changes. According to FIG. 7, the density increases as the location along the y axis increases. According to FIG. 8, the density increases as the location along the x axis increases. Under software control or dedicated hardware, it can easily be determined that with such a gradient pattern, the density within the cell 56 is concentrated in the upper right-hand corner of the cell. Of course, other density diagram patterns could indicate other locations for the densest pixels within the cell 56 if the pixels were located at other places. When an upper right-hand density gradient is determined, a threshold pattern of individual threshold values is selected which grows or develops the pixels in the cluster dot formation beginning primarily in the upper right-hand corner of the halfstone cell.

Figure 9:
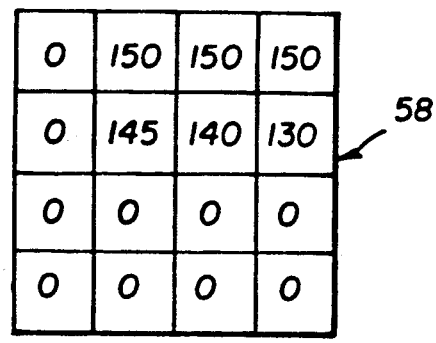
FIG. 9 illustrates digital gray-level pixel values for the cell shown in FIG. 6.
Figure 10:
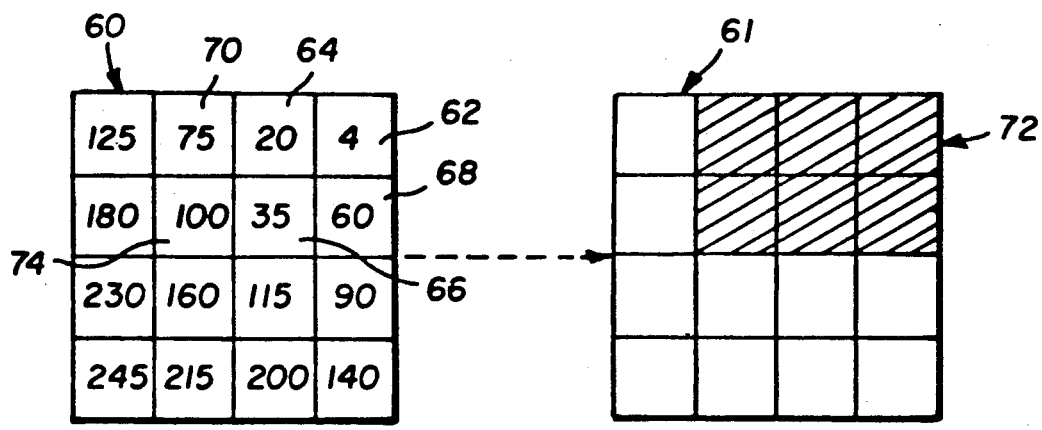
FIG. 10 illustrates a threshold template for upper right corner pixel development and the resulting binary output cell when applied to the data shown in FIG. 9.

FIG. 10 illustrates a threshold template for corner pixel development and the resulting binary output cell when applied to the data shown in FIG. 9. According to FIG. 10, the template 60 includes the same sixteen threshold levels included in the template 38 shown in FIG. 4, but arranged with the lowest values in the upper right-hand corner region of the template 60. It is to be understood that other threshold values can be used than those indicated herein. In addition, other specific patterns may be used than that shown in FIG. 10 for starting the formation in the upper right-hand corner of the cell without departing from the invention. It is important, however, that the pattern of dot formation within the threshold cell form the dots in the same general area as they occur in the original data.

By applying the threshold values within the template 60 to the data in cell 58 of FIG. 9, the output cell 61 is constructed. For example, threshold values at locations 62, 64, 66, 68, 70 and 74 are lower than the corresponding gray-level values indicated in cell 58. Thus, the six-pixel group 72 is provided in the output cell 61. The remaining pixels in the output cell 61 are not printed because the values in cell 58 do not meet the threshold limits. It is to be understood that meeting the threshold limit can be either equaling or exceeding the threshold, or just exceeding the threshold, whichever threshold criteria is being used in the particular application. Thus, the output cell 61 not only represents the total density level of the input cell 56, but also preserves some of the sharpness of the cell by concentrating the printed output pixels in the same region of the output cell in which the densest pixels of the input cell are located.

Figure 11:
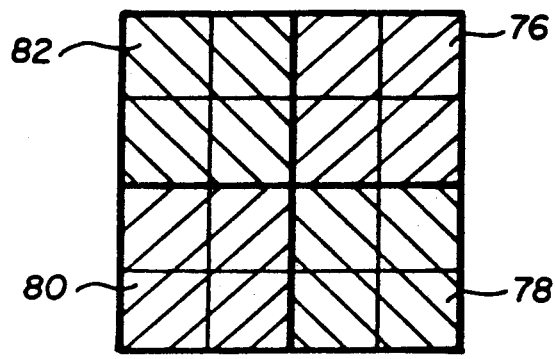
FIGS. 11, 12 and 13 illustrate pixel development regions of the output cell which have specific threshold template patterns.
Figure 12:
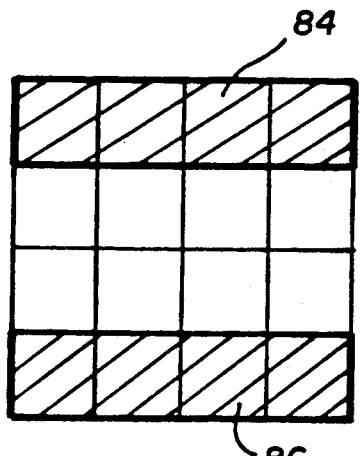
Figure 13:
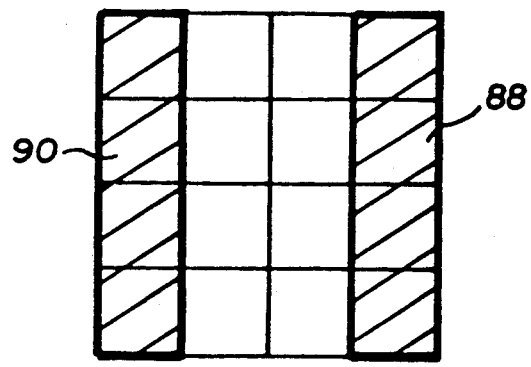

FIGS. 11, 12 and 13 illustrate other pixel development regions of the output cell which have specific threshold template patterns which can be selected from the pixel gradient determination. According to FIG. 11, the upper right-hand corner 76 is equivalent to the region just described. Other template patterns may be used to develop the pixels in the lower right-hand region 78, the lower left-hand region 80, or the upper left-hand region 82. According to FIG. 12, the template pattern may contain threshold values which tend to develop the pattern along an upper-edge region 84 or along a lower-edge region 86. Finally, according to FIG. 13, the template pattern can develop the output pixels along the right-edge region 88 or the left-edge region 90. Thus, including the original or traditional center region, there are a total of nine different template patterns which can be selected to accomplish the thresholding process for the input cell to shift the cluster dot formation to a portion of the cell which is characteristic of the original input information.

The templates can all use the same threshold values and be stored in lookup tables in the processing apparatus. It is only the arrangement or pattern of the threshold values which needs to be changed for each of the nine sharpness locations specified or determined for the input data. FIG. 14 is typical of one of the other template patterns, with this particular pattern 92 being used in the case where right-edge dot development is desired. As can be seen in FIG. 14, the four lowest threshold values are along the right-edge of the template 92. The progessively increasing threshold values progress to the left of the four lowest values, as indicated by the numerical sequence of the values in template 92. It is emphasized that other progressing patterns may be used than the one illustrated without departing from the invention.

FIG. 15 illustrates a threshold template for upper left corner pixel development and the resulting binary output cell when applied to the data shown in FIG. 3. The template 93 includes the same threshold values as previously described, but arranged in a pattern to develop the binary pixels from the upper left-hand corner of the output cell 95. By comparing, pixel-by-pixel, the threshold values and the gray-level data shown in FIG. 3, the five-pixel group 97 is produced in the output cell 95. Comparing this output cell to the output cell 52 shown in FIG. 5 which is developed from the same gray-level data, it can be seen that the binary cell provided by this invention yeilds a printing pattern which is more representative, in sharpness, of the input image shown in cell 22 of FIG. 2.

FIG. 16 is a block diagram illustrating the apparatus components used to practice the invention according to this specific embodiment. The data is applied to the halftone cell generator 94 which converts or arranges the rasterized data into a predetermined halftone cell orientation. It is also emphasized that the halftone cell does not necessarily have to be a 4×4 matrix as used in this specific embodiment of the invention. Once the cells have been formed, the cell gradient analyzer 96 determines the general placement of the densest pixels within the cell to determine which template to apply in the thresholding process. As indicated by block 98, the cell gradient analyzer 96 may also take into consideration the density of pixels in neighboring or adjacent cells in determining the template to be used. This can be used to prevent some isolated or stray pixels in a particular cell from dictating a template which would not necessarily be correct for the image being represented by the neighboring cells. The template selector 100 takes the gradient information and selects the template (one of nine in this specific embodiment) which most closely matches the density distribution within the input cell. Next, the template is used to threshold, pixel-by-pixel, the data from the input cell, as indicated in block 102. This produces the output binary halftone cell which is applied to the print engine 104 for rendering or printing. Thus, by preserving the benefits of dot cluster formation and without having to create or determine new threshold levels, this invention can be used to select particular patterns of threshold level location to preserve some of the sharpness in the original input cell. Instead of rendering the output with a binary print engine 104, it is within the contemplation of the invention that other binary rendering devices may be used, such as a binary video monitor.

It is emphasized that numerous changes may be made in the above-described system without departing from the teachings of the invention. It is intended that all of the matter contained in the foregoing description, or shown in the accompanying drawings, shall be interpreted as illustrative rather than limiting.

I claim as my invention:

1. Apparatus for processing image data which is to be rendered by a binary rendering device, said apparatus comprising:
   means for dividing the image data into a plurality of halftone cells each containing a plurality of pixels having respective pixel values;
   means for determining characteristics of the density distribution within a subject halftone cell based upon analyzing the pixel density gradient of the pixel values across the subject halftone cell and by also analyzing the pixel density gradient in at least one neighboring halftone cell without changing the pixel values of the respective pixels;
   means for selecting a threshold template based upon the density distribution characteristics, said template containing separate threshold values for each pixel in the subject halftone cell; and
   means for comparing each of the respective pixel values of the pixels in the subject halftone cell with the corresponding threshold value in the selected template to produce an output cell containing binary pixel data for use by the rendering device.

2. The image processing apparatus of claim 1 wherein said halftone cells and said output cells have the same number of pixels per cell.

3. The image processing apparatus of claim 1 wherein the binary pixel data in the output cell contains the binary value for each pixel which causes a pixel to be rendered by the rendering device when the threshold corresponding to that pixel has been met by the halftone cell data.

4. The image processing apparatus of claim 1 wherein the halftone cells have an equal number of pixels along each edge of the cell.

5. The image processing apparatus of claim 4 wherein the halftone cells contain exactly sixteen pixels arranged in a 4×4 pattern.

6. The image processing apparatus of claim 1 wherein each threshold template selected has its lowest threshold values generally located in a region corresponding to the region of the halftone cell where the densest pixels are located, thereby causing the rendered binary pixels to develop from the same region.

7. The image processing apparatus of claim 1 wherein the selecting means selects from nine different threshold templates.

8. The image processing apparatus of claim 7 wherein each template has a unique threshold pattern to develop pixels in the output cell around different areas of the output cell, with the areas being the four edges of the cell, the four corners of the cell, and the center of the cell.

* * * * *